US008046815B2

(12) United States Patent
Kim et al.

(10) Patent No.: US 8,046,815 B2
(45) Date of Patent: Oct. 25, 2011

(54) OPTICAL NETWORK FOR BI-DIRECTIONAL WIRELESS COMMUNICATION

(75) Inventors: Yong-Deok Kim, Seoul (KR); Chang-Sup Shim, Seoul (KR); Jun-Ho Koh, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1081 days.

(21) Appl. No.: 11/192,599

(22) Filed: Jul. 29, 2005

(65) Prior Publication Data
US 2006/0123126 A1 Jun. 8, 2006

(30) Foreign Application Priority Data

Dec. 7, 2004 (KR) .................. 10-2004-0102388

(51) Int. Cl.
*H04N 7/173* (2006.01)
(52) U.S. Cl. .................... 725/116; 725/93
(58) Field of Classification Search ............ 375/240.15
See application file for complete search history.

(56) References Cited

U.S. PATENT DOCUMENTS

| 6,393,057 | B1 | 5/2002 | Thoreau et al. | 375/240 |
|---|---|---|---|---|
| 2001/0033619 | A1* | 10/2001 | Hanamura et al. | 375/240.26 |
| 2001/0047517 | A1* | 11/2001 | Christopoulos et al. | 725/87 |
| 2002/0196850 | A1* | 12/2002 | Liu et al. | 375/240.12 |
| 2003/0200337 | A1* | 10/2003 | Jabri et al. | 709/246 |
| 2004/0184540 | A1* | 9/2004 | Miura et al. | 375/240.12 |
| 2004/0240856 | A1* | 12/2004 | Yahata et al. | 386/98 |
| 2004/0267954 | A1* | 12/2004 | Shen | 709/231 |
| 2006/0193380 | A1* | 8/2006 | Laksono | 375/240.01 |
| 2007/0143800 | A1* | 6/2007 | Salomons | 725/74 |
| 2007/0274675 | A1* | 11/2007 | Park | 386/66 |

FOREIGN PATENT DOCUMENTS

| CN | 1460378 | 12/2003 |
|---|---|---|
| CN | 1535465 | 10/2004 |
| JP | 2000-165436 | 6/2000 |
| JP | 2004-289295 | 10/2004 |
| JP | 2006-166453 | 6/2006 |

(Continued)

OTHER PUBLICATIONS

Miura, Tsuyoshi, et al.; Patent Application Publication No. US 2004/0184540 A1; Publication Date: Sep. 23, 2004; "Data Processing System, Data Processing Apparatus . . . ;".

(Continued)

*Primary Examiner* — Andrew Koenig
*Assistant Examiner* — Junior Mendoza
(74) *Attorney, Agent, or Firm* — Cha & Reiter, LLC

(57) ABSTRACT

A method for transmitting video data to the users via a network in a transcoder of an image processing system including a storage media having a predetermined amount of storage area is disclosed. The method includes the steps of storing in the storage media, the video data provided based on the corresponding services, monitoring a traffic condition of the network to determine if transcoding is necessary; transmitting the stored video data to the corresponding users, respectively, via the network, when the transcoding is not necessary; and transcoding the stored video data to transmit the video data to the corresponding users, respectively, when the transcoding is necessary. The video data provided is based on the corresponding services includes image information having the highest quality of service from a content provider.

13 Claims, 7 Drawing Sheets

FOREIGN PATENT DOCUMENTS

KR    2002-58635    7/2002

OTHER PUBLICATIONS

Yamazaki, Tatsuya, et al.; "Video Transmission with QoS Adjustment for Multiple Receivers Using Transcoding;" Transactions of Institute of Electronics, Information and Communication Engineers; vol. J85-B, No. 1; Jan. 2002; 12 pgs.

Hashimoto, Koji, et al.; "Design and Implementation of Transcoding Functions for Flexible Inter-Communication Environments;" IPSJ SIG Technical Reports; vol. 2003, No. 64; 9 pgs.

Kessler, Damien, et al.; Patent Application Publication No: US 2002/0191116 A1; Publication Date: Dec. 19, 2002; "System and Data Format For Providing Seamless Stream . . .;" . . .

* cited by examiner

OPTICAL NETWORK FOR BI-DIRECTIONAL WIRELESS COMMUNICATION

CLAIM OF PRIORITY

This application claims priority to an application entitled "TRANSCODING METHOD FOR CONTINUOUS VIDEO DISPLAY," filed in the Korean Intellectual Property Office on Dec. 7, 2004 and assigned Serial No. 2004-102388, the contents of which are hereby incorporated by reference.

BACKGROUND OF THE INVENTION

1. Field of the Invention

The present invention relates to a network transmission method, more particularly to a transcoding method for continuous video display regardless of bandwidth changes in a network.

2. Description of the Related Art

Real time broadcasts using an IP networks are commercially available.

When executing a conventional video data transmission, video/audio data should be transmitted in a compressed form because of large volume of data generally involved. Real time transmission characteristics are very important to various application services. Such application services include for example, a digital broadcast, a VoD (Video on Demand), video conferencing, and etc. The bandwidths of such application services can vary based on times of the services, especially in case of the best-effort scheme such as an Ethernet which generally does not have a fixed and unique bandwidth.

In the conventional video data transmission as mentioned above, losses and delays of the IP networks exert a detrimental influence on streaming services of multimedia data. Especially, the burst transmission characteristic of the IP network can severely hinder the QoS (Quality of Service) of multimedia data streaming services when providing the real time broadcast through the IP network.

For example, when a subscriber watches TV which receives a 20 Mbps HD broadcast signal of the highest QoS via a conventional network system, if the network system performance has deteriorated (due to a congestion of service requests from subscribers), the subscriber cannot continue to receive the HD broadcast service via the TV because there are no means for overcoming or curing properly the changed condition of video transmission operation.

SUMMARY OF THE INVENTION

One aspect of the present invention relates to a transcoding method for continuous video display regardless of the changes of network bandwidths, and an apparatus thereof.

Another aspect of the present invention relates to a method for realizing continuous service by reducing bit rates of the provided video data, even when network condition gets deteriorated due to a congestion of service requests from the many subscribers.

Another aspect of the present invention relates to a method for realizing continuous video display wherein the method includes the steps of storing a certain amount of video data in a transcoder, transcoding the stored video data by instructing the transcoding command, making a packet of the transcoded images for transmitting it, inserting transcoding point information into the packet, and continuing the video display using the point information in a receiving end.

One embodiment of the present invention is directed a method for transmitting video data through a network by a transcoder of an image processing system. The transcoder includes a storage media having a predetermined amount of storage area. The video data is provided according to kinds of services. The method includes the steps of: storing in the storage media, the video data provided based on the corresponding services; monitoring a traffic condition of the network to determine if transcoding is necessary; transmitting the stored video data to the corresponding users, respectively, via the network, when the transcoding is not necessary; and transcoding the stored video data to transmit the video data to the corresponding users, respectively, when the transcoding is necessary, wherein the video data provided based on the corresponding services includes image information having the highest quality of service.

Another embodiment of the present invention is directed a method for receiving video data provided based on corresponding users, respectively, via a network, in an image processing system. The method includes the steps of: receiving the video data provided based on the corresponding users, respectively; determining if transcoding point information has been inserted into the video data; displaying the received video data when the transcoding point information is not inserted into the video data; identifying PTS (Presentation Time Stamp) when the video data have been transcoded, based on the transcoding point information (when the transcoding point information is) included in the transcoded video data; and interrupting displaying of the received video data at the time of the PTS of the transcoding, and displaying the transcoded video data. The received video data includes video data which are not transcoded and has the highest quality of service. The transcoded video data includes video data having relatively lower quality of service than that of the received video data.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. a detailed description of known functions and configurations incorporated herein will be omitted when it may obscure the subject matter of the present invention. Further, various terminologies found in the following description may be changed according to a practice or an intend which a user or an operator using those words may have, and are provided only to help general understanding of the present invention. Therefore, the definitions of the terminologies used herein should be understood based on general purpose or description of the specification, and it is apparent to those skilled in the art that the present invention can be implemented without such definitions.

Figure 1:
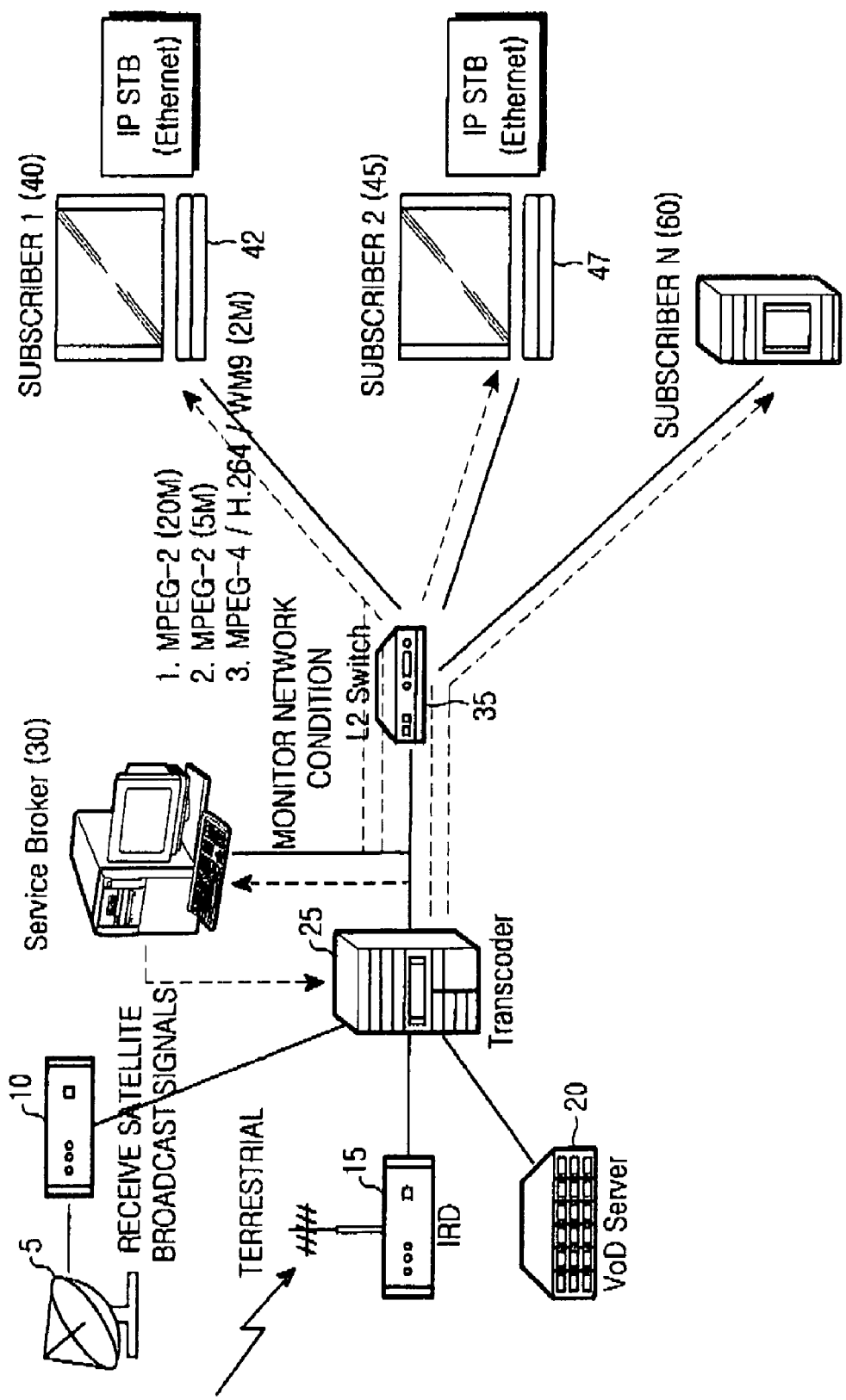
FIG. 1 is a diagram of an image processing system using a transcoder and a service broker according to an embodiment of the present invention.

FIG. 1 is a diagram of an image processing system using a transcoder and a service broker according to an embodiment of the present invention.

In a network receiving video data from a service provider, a service broker 30 monitors bandwidths that the network uses currently. A transcoder 25 changes bit rates of the received video data based on the current bandwidths of the network to transmit the resultant video data to each of subscribers 40, 45 and 60 through L2 switch (or layer2 switch) 35.

In the data transmission process mentioned above, broadcast equipments 10, 15 and 20 of the service provider are usually located on a head-end providing a function for connecting with an external network or on an OLT (Optical Line Terminal) supporting a capability for connecting multi-services. Such broadcast equipments include, for example, an IRD (Integrated Receiver Decoder) 10 and 15 for receiving information transmitted through a satellite broadcast or terrestiral digital broadcast, and a VoD server 20.

The transcoder 25 includes an input section and an output section, and transcodes the video data transmitted from the broadcast provider. The data input to the transcoder 25 is, for example, high quality video content that is compressed into a standard compression stream such as MPEG-2 (Moving Picture Experts Group-2). The high quality video content is input to the transcoder 25, for example, from a storage media for video service or a real time broadcast transmission media. The transcoder 25 transcodes and outputs just the standard compression stream.

The transcoding process may include a step of converting a previous compressed stream into a current stream that has the same compression type as that of the previous stream. But the current stream will have a relatively lower bit rate than that of the previous stream or a different resolution from that of the previous stream. The transcoding process may include a step of converting, in real time, a previous stream into a current stream that has a different compression type from that of the previous stream. A dynamic image transcoder includes decoders and encoders connected with the decoders. The dynamic image transcoder decodes the bit streams of input dynamic images, and encodes the decoded bit streams into different bit streams of dynamic images during the transcoding process.

The transcoder 25 is connected between the broadcast equipments and the switch 35. Also the transcoder 25 may be also connected to application units located in the homes like ONU (Optical Network Unit) and home gateway. An OLT (Optical Line Terminal) and the ONU (Optical Network Unit) are typical equipments used in the optical networks. The OLT is connected with the broadcast equipments, and the ONU is terminal equipment for providing service interfaces to final users. The OLT receives video data from a broadcast equipment operator, and transmits the received video data to the ONU which then relays the video data to the subscribers.

A network monitoring system, such as the service broker 30, monitors bandwidths that are available for the network, and selects bit rates for images which should be transcoded in the transcoder 25 based on the monitored results of the network condition The L2 switch 35 reads the destination MAC address of a packet from the MAC address table, forwards the packets to corresponding ports such that the subscribers 40, 45 and 60 can receive video data through corresponding receivers which include, for example, an IP STP (Set Top Box), a subscriber terminal or a decoding application program loaded on a computer.

As shown in FIG. 1, when the subscribers 40 is receiving the highest QoS HDTV (High Definition Television) broadcast of MPEG-2 20 Mbps, and at the same time the subscriber2 45 suddenly occupies network bandwidths that the subscriber N 60 has used such that the network condition gets deteriorated or the accesses of the subscribers grows into a congestion, the service broker 30 identifies such a network condition, and sends the network condition information to the transcoder 25. The transcoder 25 then transcodes the high quality HDTV broadcast of the MPEG-2 20 Mbps into a standard definition of MPEG-2 5 Mbps, or a video data of relatively lower bit rates by using CODEC (Coder/Decoder) such as MPEG-4/H.264/Window Media9 2 Mbps.

Figure 2:
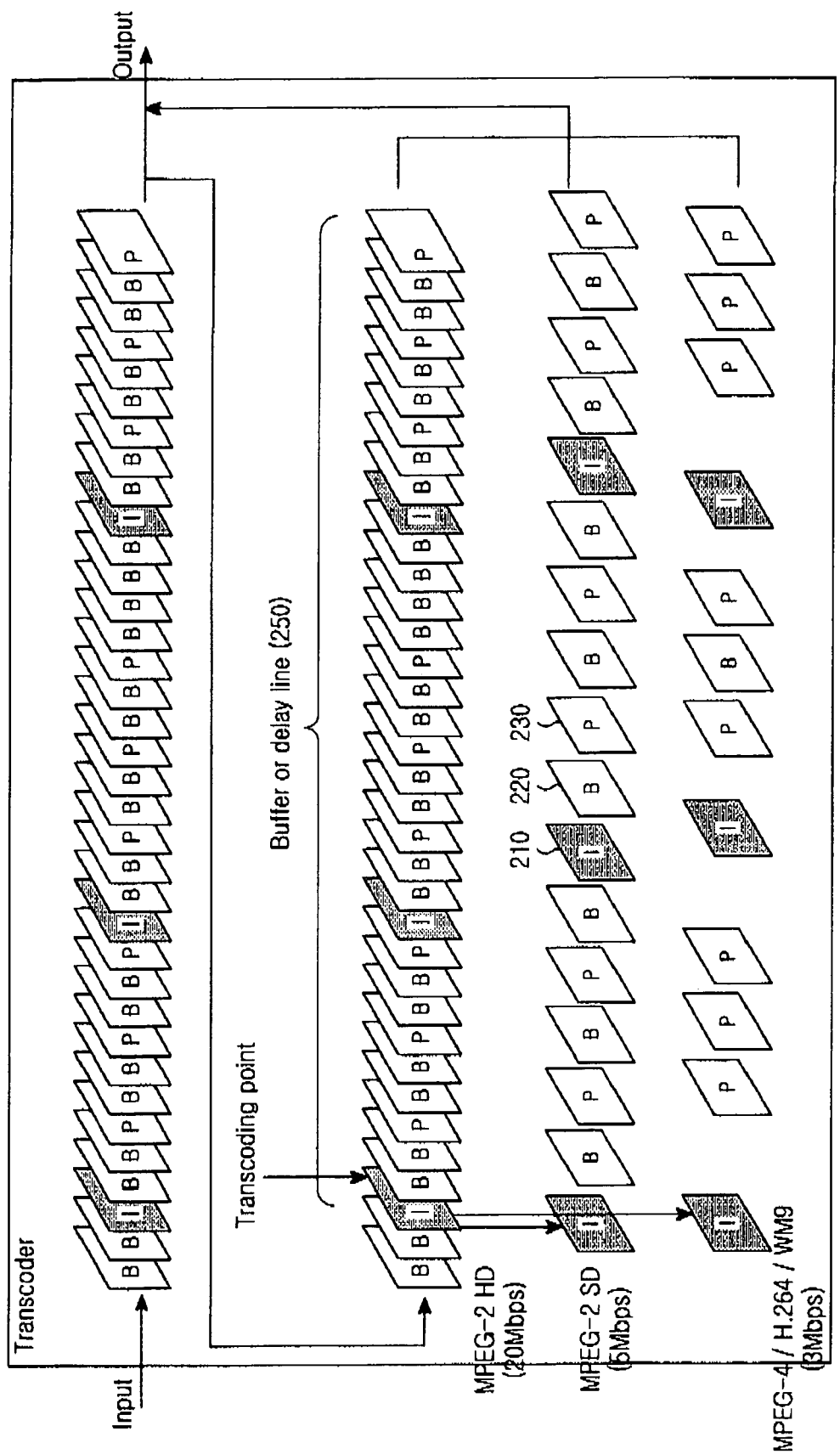
FIG. 2 illustrates a process sequence in the transcoder according to an embodiment of the present invention.

FIG. 2 illustrates the structure of a transcoder according to an embodiment of the present invention.

In the transcoding process of the transcoder, the bit rate can be reduced through an MPEG compression technique. The MPEG compression technique is a method capable of compressing the video data by reducing excessive information in light of both space and time. Each of the MPEG-2 video streams has three kinds of frames. One type is an I-picture 210 for removing only a frame-itself duplications, another type is a P-picture for removing not only time duplications overlapped with a previous frame but also the frame-itself duplications, and the third type is a B-picture 230 for removing not only time duplications overlapped with a previous frame or a next frame but also the frame-itself duplications.

The frame structure may be constructed variously by changing values of parameters N and M. The parameter N indicates a frame number in GOP (Group of Picture), and the M indicates an interval between two pictures. A typical frame structure has generally IBBPBBP, . . . , or IBPBPBPBP, . . . ,. However, the P-picture 220 or B-picture 230 cannot be recovered from its compression state in itself, but can be reproduced to the corresponding images with the information of other I-picture 220 or B-picture 220. Therefore, the B-picture 230 or the P-picture 220 cannot be used for a reference for translating into video data having different bit rates with a same compression format or for transcoding into video data having different compression formats in the transcoder.

When sufficient bandwidths have been secured in the network, the MPEG-2 HD streams of the high quality/mass storage are usually bypassed to be output without transcoding the streams. In order to transcode the MPEG-2 HD streams into a stream of the lower bit rate, I-picture 210 which can construct a perfect image in itself is used for a reference for transcoding.

Referring to FIG. 2, the transcoder packetizes the transcoded I-picture 210 for frame transmission with a transcoding point inserted into each overhead of the packets.

When a subscriber watches video data via a receiver that receives the transcoded image of different bit rates with a same format or a transcoded image of the different formats, the inserted transcoding point information allows the receiver to monitor the transcoded image and display a continuous video data such that sensitivity of the transcoded image portion in HV (Human Visual) can be relatively reduced, accordingly.

Figure 3:
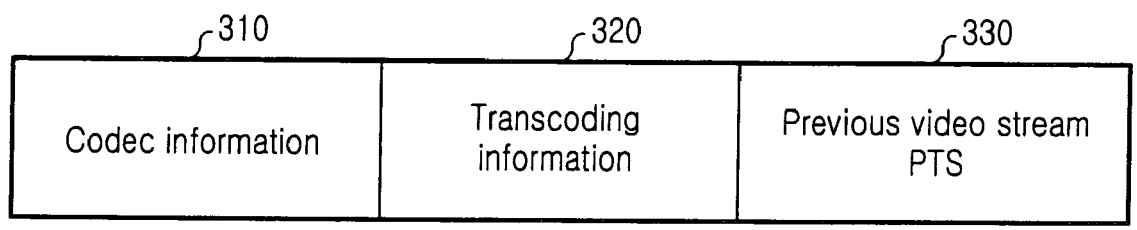
FIG. 3 illustrates a structure of transcoding point information according to an embodiment of the present invention.

FIG. 3 illustrates a structure of the transcoding point information according to an embodiment of the present invention.

The transcoding information includes codec information 310, transcoding information 320 and PTS (Presentation Time Stamp) 330, which is time information for synchronous reproducing. The codec information 310 indicates a video format type of the transcoded video data, and the transcoding information 320 has resolution information and profile information about the image data.

The PTS (Presentation Time Stamp) 330 has a PTS of the original video data, which is prior to being transcoded, in order to basically determine the range of the transcoded section and compare the range of the transcoded section with the range of the video data section which have been displayed in the decoder of a receiving end.

Referring to FIG. 2, when the available bandwidths of the network decrease, and as a result it is impossible to identify the exact range of the video data frames which have reached perfectly the receiving end without any error, the transcoder sends existing video data to the output terminal, and at the same time, stores certain volumes of the video data information in a memory 250 such as a delay line and a buffer.

When receiving a command for a transcoding request from the service broker, the transcoder transcodes firstly just the video data information stored in the memory 250 such as the delay line or the buffer, not the video data which have been input at the time of the command occurrence. Also, the transcoder transmits the transcoded video data information to each receiver which identifies a transcoding point value of the transcoded streams and displays the video data having PTS corresponding to the transcoding point value. The receiver then switches to the transcoded video data through which continuous video displays are provided.

Figure 4:
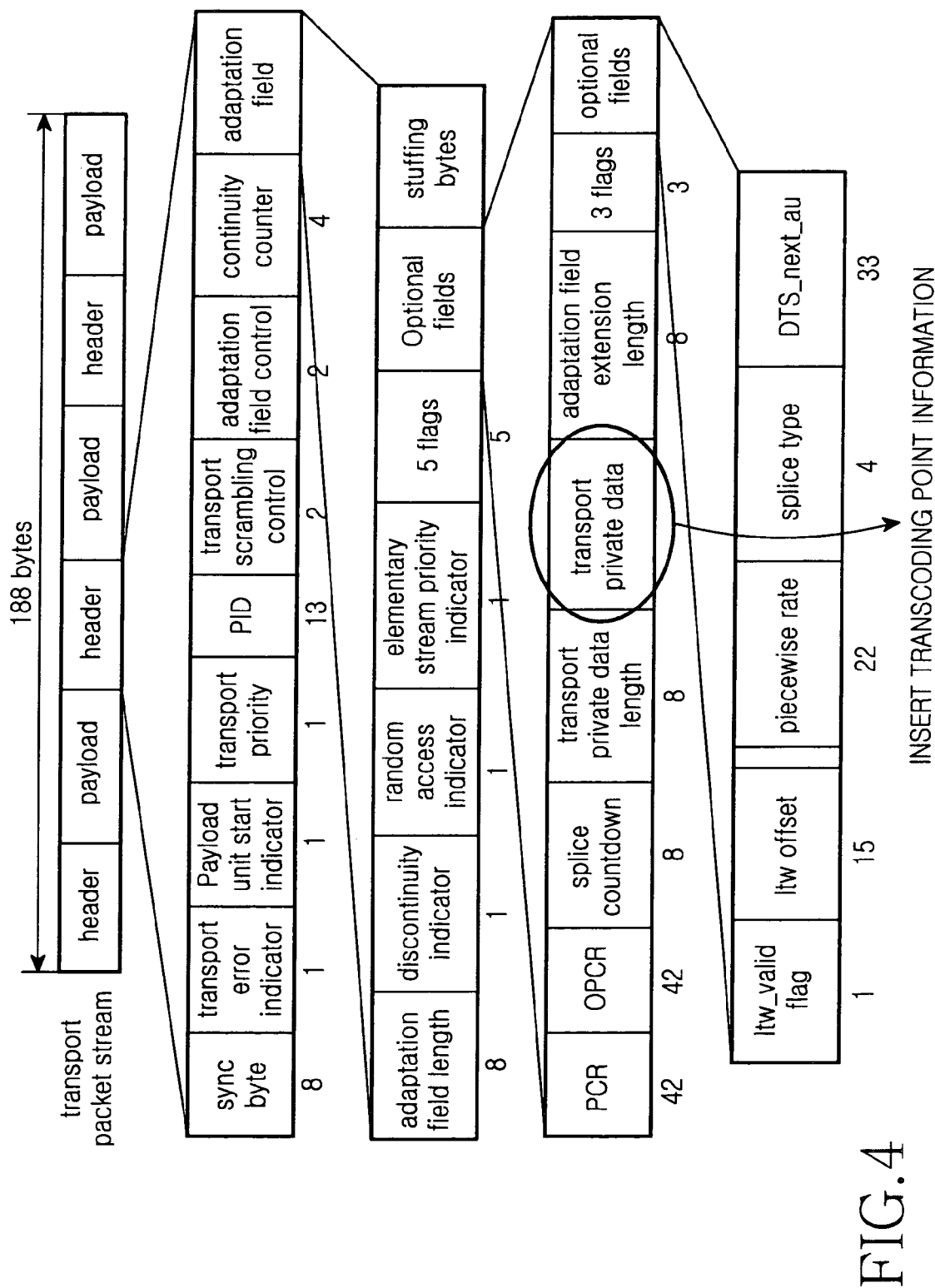
FIG. 4 is a view for explaining insertion of the transcoding point information in a transport packet stream according to a first embodiment of the present invention.

FIG. 4 is a view for explaining insertion of the transcoding point information in a transport packet stream, according to a first embodiment of the present invention.

The MPEG-2 system among the digital broadcast data types adopts a packet division scheme that is used in a TDM (Time Division Multiplexing) scheme. In this scheme, video and audio bit streams are first divided into a proper length of bit stream called a packet (hereinafter referred to as "PES": Packetized Elementary Stream), respectively. The PES packet has a higher length limit of 64 KB for adapting various applications. Also each PES packet may have fixed or variable length if necessary, and may further have variable transmission speed. Furthermore, the PES packets can be transmitted intermittently.

As mentioned above, all the PES are multiplexed into a single bit stream to be a program stream (PS) or a transport stream (TS). The program stream is a packet used for the MPEG-1 system and the transport stream is used for the TV broadcast and transmission.

Referring to FIG. 4, the transport packet stream is composed entirely of 188 bytes, and has a control or instruction information in the header thereof. An adaptation field, which is one of the header elements, has optional fields as well as other elements. The transcoding point information can be inserted into transport private data that is contained in the optional fields.

Figure 5:
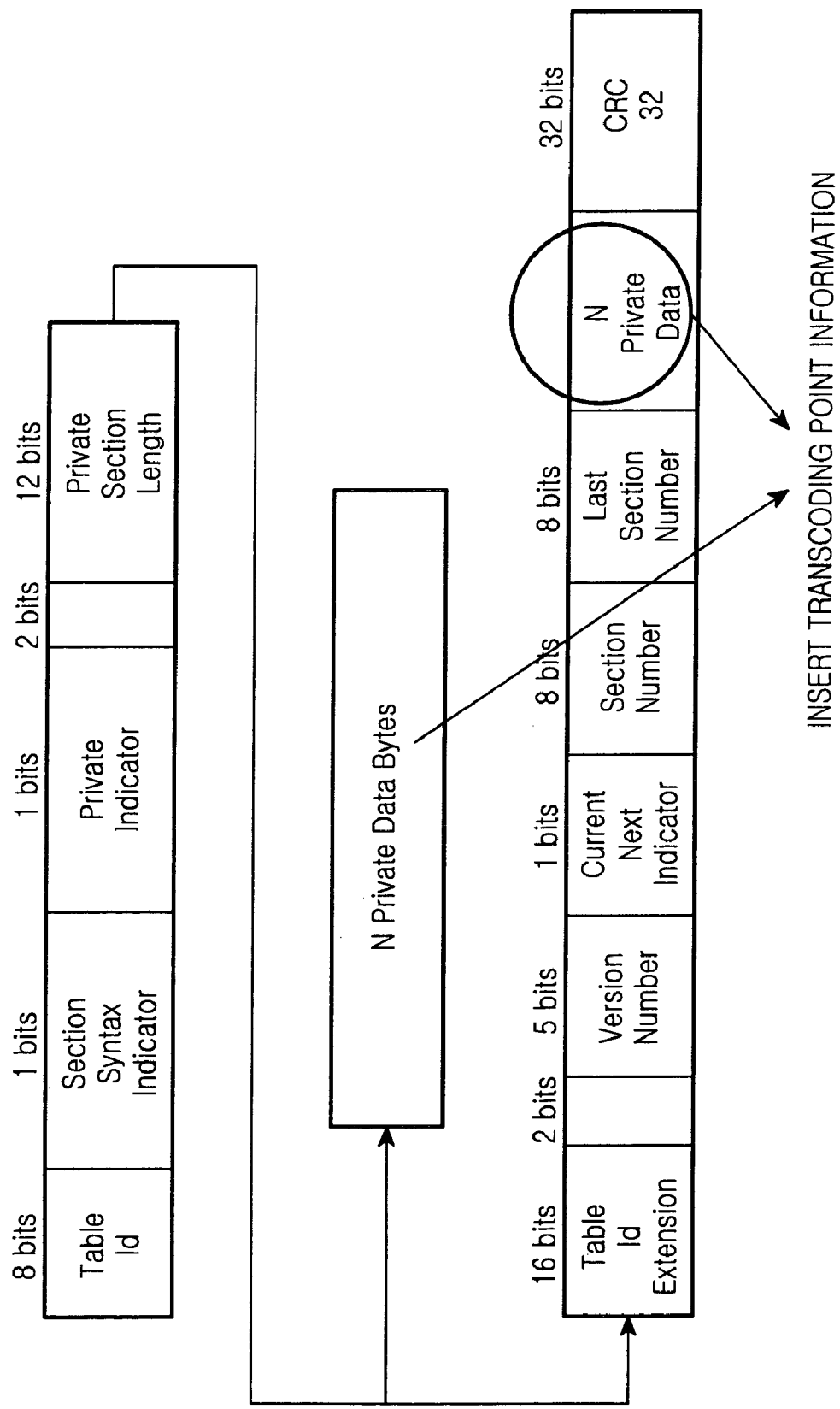
FIG. 5 is a view for explaining insertion of the transcoding point information in a private section according to a second embodiment of the present invention.

FIG. 5 is a view for explaining insertion of the transcoding point information in a private section, according to a second embodiment of the present invention.

The second embodiment is a method in which the transcoding point information is inserted into a private section. The private section is a flexibly-defined standard for enabling to transmit user-defined data accompanied with the transport streams (The standard is "MPEG-2 system standard ISO/IEC13818-1).

A kind of program guide information or service information is divided into sections each of which a table_id for identification is allocated to, respectively. Among the table_ids, 0x40 to 0x7F and 0x80 to 0xBF are in the range of the user private section.

For example, in both cases of an ATSC of USA type and a DVB of EU type using MPEG-2 system, an unique system information is inserted into the user private section to be transmitted therewith. As shown in FIG. 5, the private section includes several fields. The transcoding point information is inserted into the N private data bytes and the N private data which belong to the several fields of the private section to transmit the inserted transcoding point information to the receivers.

Figure 6:
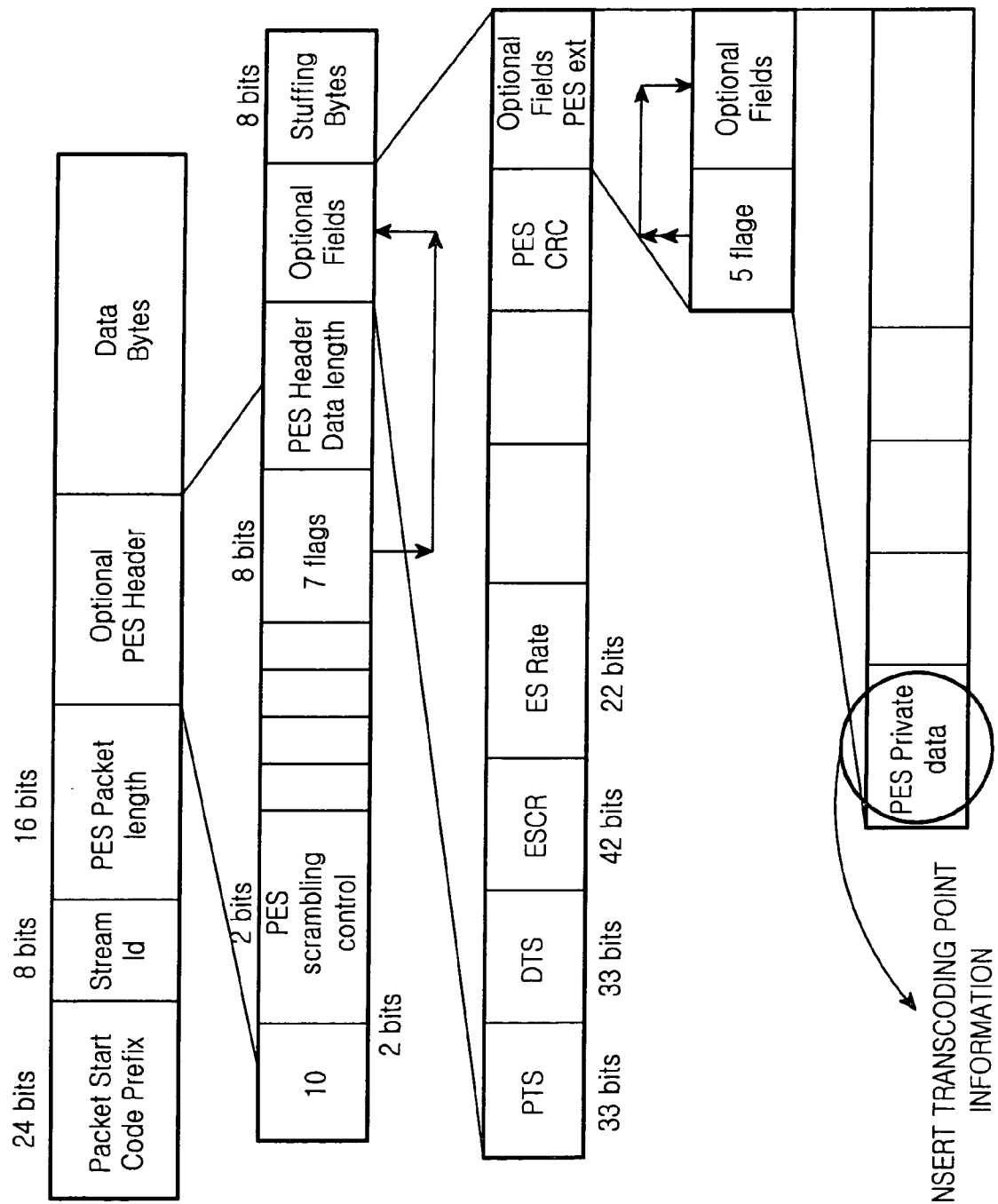
FIG. 6 is a view for explaining insertion of the transcoding point information in a packet header according to a third embodiment of the present invention.

FIG. 6 is a view for explaining insertion of the transcoding point information in a packet header, according to a third embodiment of the present invention.

The third embodiment is a method in which the transcoding point information is inserted into a header of the PES packet. Specifically, an optional PES header has optional fields as well as other elements. The optional fields have optional fields PES which have 5 flags and optional fields which have PES private data into which the transcoding point information is inserted.

As mentioned in FIGS. 4 to 6, the transcoding point information can be inserted into each of the private sections or fields of the packet header. The receiver that has received the packet including transcoding point formation uses the transcoding point information from the packet.

Figure 7:
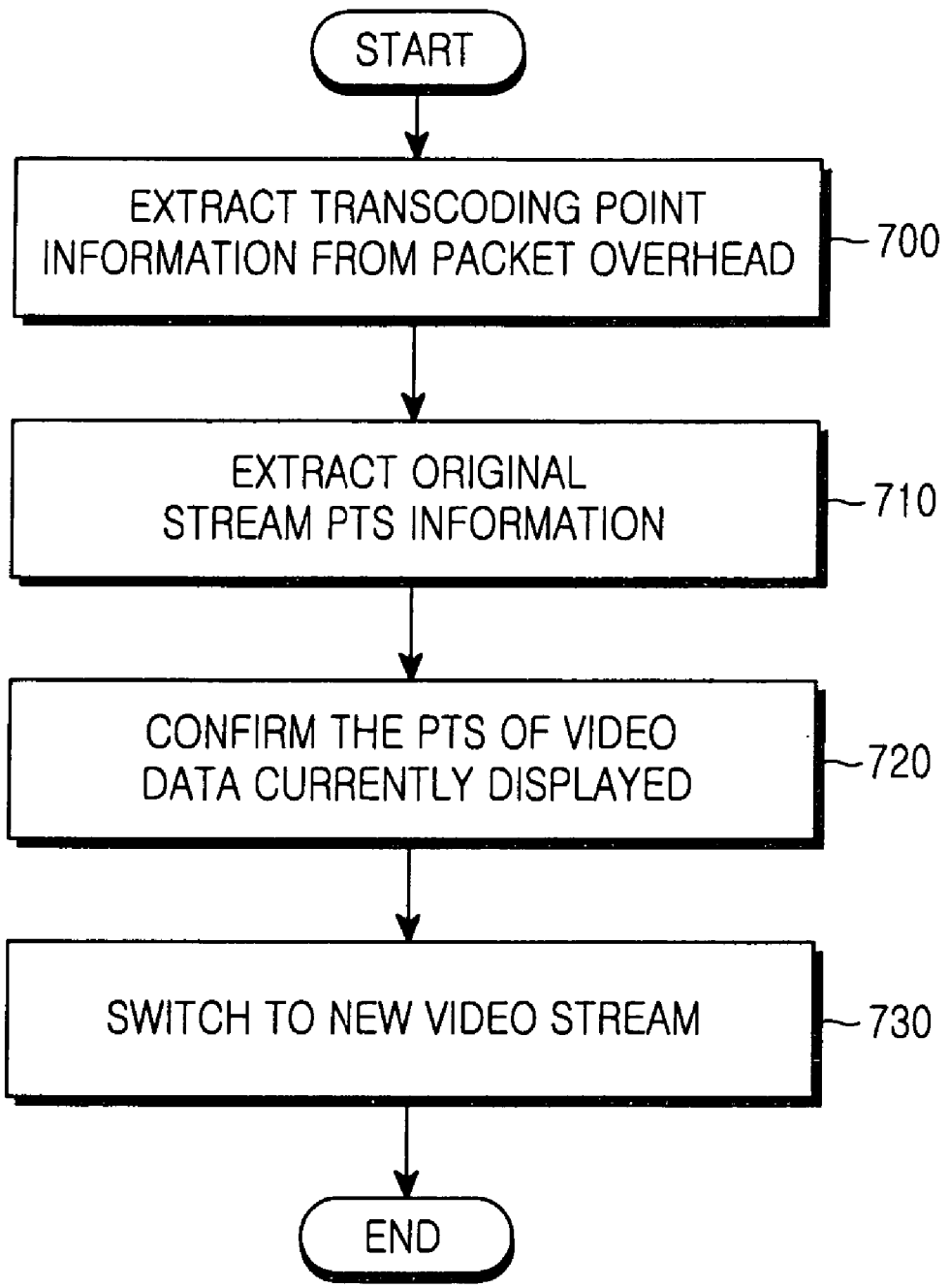
FIG. 7 is a flow chart for explaining a process for extracting the transcoding point information in a receiver according to an embodiment of the present invention.

FIG. 7 is a flow chart for explaining a process for extracting the transcoding point information in a receiver according to an embodiment of the present invention.

The receiver receives video data provided according to corresponding user via a network. Then, if a transcoding point information is not contained in the received video data, the receiver displays the video data as received.

If the receiver, however, receives the video data that have been transcoded in the transcoder, then in step 700, the receiver extracts the transcoding point information inserted into the packet over header of the received video data. Next, in step 710, the receiver extracts the PTS information of the original video data contained in the transcoding point information. Then in step 720, the receiver confirms the PTS information of the video data currently displayed thereon. Next in step 730, just at the time of PTS (Present Time Stamp) when the video data have been transcoded, and also which has been previously identified or confirmed from the PTS information, the receiver interrupts displaying of the original video data, and switches to the transcoded video data to continue displaying of the video data.

According to the embodiments as described above, the effects of the disclosed invention are as followings.

When the network condition gets suddenly deteriorated such that the available bandwidths of the network decreases, it is impossible to determine or specify the reliable range of the mass storage video data which have been transmitted from the originated sender up to the subscribers' sides.

In this stage, the buffer stores therein a certain volume of the video data which have been output from the transcoder. Next time, when receiving a transcoding command from the network monitoring system, the transcoder transcodes at first the certain volume of the video data previously stored in the buffer, and inserts the transcoding point information thereto such that the video data can be continuously switched if necessary in the video displayers having decoder mounted thereon like the set top and PC. As a result, the receiver switches the current images to the transcoded video data if necessary to display continuous video data without deteriorating users' visual senses.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for transmitting video data through a network by a transcoder of an image processing system, the transcoder including a storage media having a predetermined amount of storage area, the video data being provided according to a plurality of types of services, the method comprising the steps of:
    transmitting the video data provided based on at least one of the plurality of types of services via the network, and, at the same time, temporarily storing in the storage media, a copy of a predetermined amount of the already-transmitted video data in a non-transcoded format;
    monitoring a traffic condition of the network to determine if transcoding is necessary;
    continuously transmitting the video data via the network, when the transcoding is not necessary;
    transcoding the stored video data to transmit the video data, when the transcoding is necessary; and
    inserting a transcoding point information having PTS(Presentation Time Stamp) of the transcoding, to the video data, during packetizing the video data, wherein the transcoding point information has the PTS of non-transcoded original video data.

2. The method as claimed in claim 1, wherein the video data provided based on at least one of the plurality of types of services includes image information having the highest quality of service offered by a content provider.

3. The method as claimed in claim 2, wherein, in the step of transcoding, the video data having the highest quality of service stored in the storage media is converted into video data having a lower quality of service than the video data having the highest quality.

4. The method as claimed in claim 1, wherein the traffic condition of the network varies based on the numbers of users to which video data is provided via the network.

5. The method as claimed in claim 1, wherein when the traffic condition of the network become deteriorated, it is determined that the transcoding is necessary.

6. The method as claimed in claim 1, wherein the transcoding point information is inserted into a header of the transport stream packet and is transmitted with the header.

7. The method as claimed in claim 1, wherein the transcoding point information is inserted into a private section which is transmitted through transport streams, and is transmitted with the private section.

8. The method as claimed in claim 1, wherein the transcoding point information is inserted into a header of a PES (Packetized Elementary Stream) packet and is transmitted with the header.

9. A method for receiving video data provided based on corresponding users, respectively, via a network, in an image processing system, the method comprising the steps of:
    receiving the video data provided based on the corresponding users, respectively;
    determining if transcoding point information has been inserted into the video data;
    providing the received video data for display when the transcoding point information is not inserted into the video data;
    identifying PTS (Presentation Time Stamp) when the video data have been transcoded, based on the transcoding point information included in the transcoded video data; and
    interrupting the providing of the received video data at the time of the PTS of the transcoding, and providing the transcoded video data for display;
    wherein the received video data includes video data which are not transcoded and has the highest quality of service from a content provider, and the transcoded video data includes video data having relatively lower quality of service than that of the received video data, wherein the transcoded video data comprises a copy of non-transcoded original video data that was retrieved from a temporary storage of already-transmitted video data and transcoded, and wherein the transcoding point information has the PTS of non-transcoded original video data which have been already-transmitted to the image processing system.

10. The method as claimed in claim 9, wherein the transcoding point information is inserted into a header of the transport stream packet and is transmitted with the header.

11. The method as claimed in claim 9, wherein the transcoding point information is inserted into a private section which is transmitted through transport streams and is transmitted with the private section.

12. The method as claimed in claim 9, wherein the transcoding point information is inserted into a header of PES (Packetized Elementary Stream) packet and is transmitted with the header.

13. The method as claimed in claim 9, wherein the method further comprises a step of displaying the received video data.

* * * * *